United States Patent [19]

Weber

[11] Patent Number: 5,011,231

[45] Date of Patent: Apr. 30, 1991

[54] CHEVROLET RALLY CAP KEEPER

[76] Inventor: David S. Weber, 141 Maple St., Lake Ronkonkoma, N.Y. 11779

[21] Appl. No.: 571,511

[22] Filed: Aug. 22, 1990

[51] Int. Cl.$^5$ ............................................... B60B 7/16
[52] U.S. Cl. ............................... 301/37 AT; 301/37 R
[58] Field of Search ............ 301/37 R, 37 AT, 108 R; 70/225, 258, 259

[56] References Cited

U.S. PATENT DOCUMENTS

| | | | |
|---|---|---|---|
| 2,695,195 | 11/1954 | O'Day | 301/37 AT |
| 2,885,931 | 5/1959 | McDonald et al. | |
| 4,116,490 | 9/1978 | Huff et al. | 301/37 AT |
| 4,171,851 | 10/1979 | Scruggs | 70/258 X |
| 4,193,640 | 3/1980 | Jones | 301/37 AT |
| 4,280,348 | 7/1981 | Teston | |
| 4,290,283 | 9/1981 | Labrecque | |
| 4,869,084 | 9/1989 | Mack et al. | |

OTHER PUBLICATIONS

Eckler's Catalog No. 240 Spring/Summer 1990.

Primary Examiner—Russell D. Stormer
Attorney, Agent, or Firm—Leonard Belkin

[57] ABSTRACT

A device for securing a Chevrolet rally cap to the wheel of an automotive vehicle to deter the theft of the cap. The device is completely hidden from view and consists of a ring which attaches to the inside of the rally cap, cables extending from said ring having washers at the other end. The cables are of sufficient length to permit the washers to be mounted on the wheel stud lugs while the ring is attached to the rally cap. After the washers are mounted then the rally cap is mounted on the wheel rim in conventional fashion, by frictional engagement. The cables remain nested within the cap and are not visible. If the rally cap is pried loose in an attempt to steal it, the cables will prevent the theft and the thief will not be able to remove the cap without finding out first how the cap is restrained and then obtaining a tool to release the cap. This effectively acts as a deterrent to casual thievery.

6 Claims, 2 Drawing Sheets

FIG. 5
FIG. 3
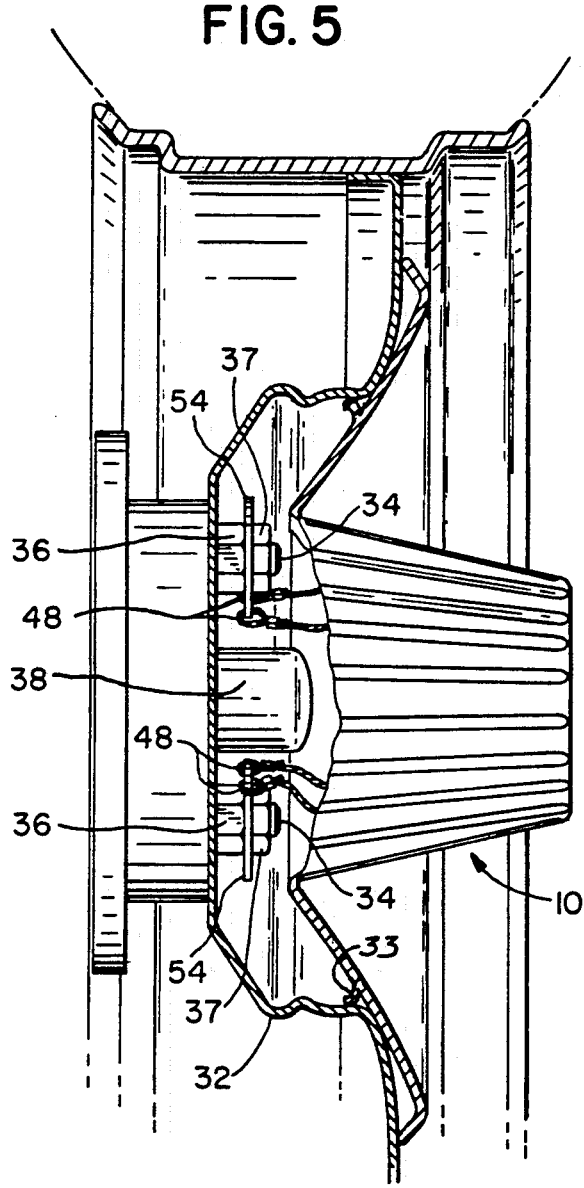
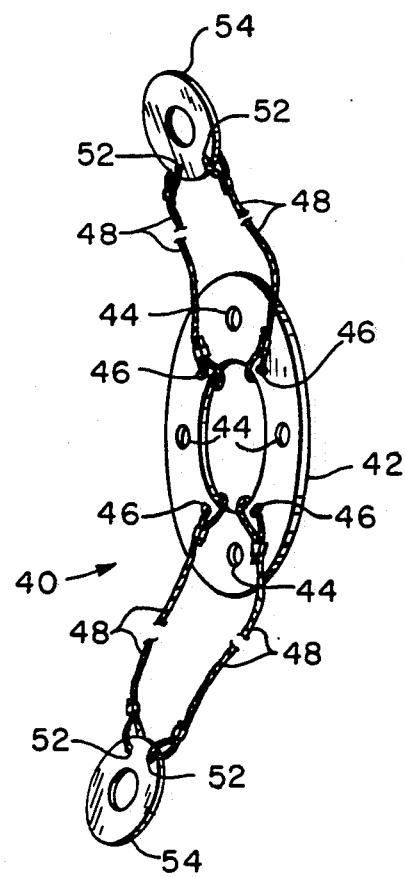
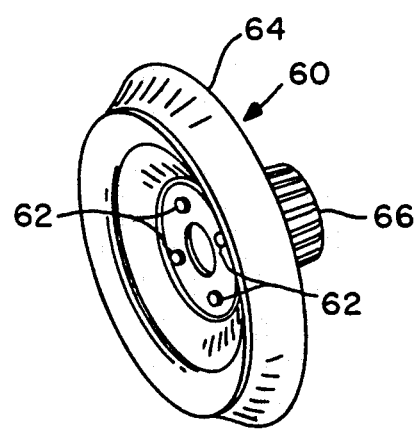
FIG. 6

CHEVROLET RALLY CAP KEEPER

BACKGROUND OF THE INVENTION

The present invention relates to a rally cap keeper and more particularly to an anti-theft device for use in inhibiting the theft of a rally cap.

The rally cap to which this invention pertains is the wheel cover made by General Motors, Chevrolet division for use on its Camaro, Chevelle, Monte Carlo, Impala, El Camino, Corvette, and Nova for model years 1968 through 1975. This rally cap is referred to herein as the large rally cap. A small cap of similar construction was made for these same automobiles for the year 1967.

The rally caps as herein described are expensive to replace but unfortunately are readily removable and therefore are prone to theft. In typical hub cap fashion they are snapped into place over the wheel lugs and just as easily pried loose for removal.

A variety of devices have been developed to prevent or inhibit the theft of wheel covers and hub caps from automobiles.

U.S. Pat. No. 2,885,931 discloses a hub cap locking device utilizing a key lock passing through the center of the cap for locking the cap in place. A key is required to remove the hub cap. The lock is visible when the cap is in place.

U.S. Pat. No. 4,280,348 shows a wheel cover locking device utilizing a customized lock nut which requires a customized matching wrench for its removal. The nut passes through the cover and is visible.

U.S. Pat. No. 4,290,283 illustrates a hub cap lock device which is mounted on the air valve or on a threaded stud for engaging the cap to prevent its removal. A key is necessary to unlock the device and its presence appears to be visible.

U.S. Pat. No. 4,869,084 shows a vehicle wheel cover lock which uses a cable tie connected between a wheel lug stud and a customized locking screw mounted on the outside of the cover. A customized wrench is required to unlock the cover and the locking screw is visible.

Eckler's Catalog No. 240, Spring Summer 1990, page 7 shows Rally Wheel Center Cap Lock's using a cable anchored to one lug nut.

The preceding patents and publication do not teach the present invention.

SUMMARY OF THE INVENTION

In this invention the rally cap of the type herein described is provided with a device which will inhibit the theft of the cap. The device is not visible to an observer who would therefore not be able to ascertain how the cap can be removed. While the present invention could not prevent a serious effort at the removal of the cap, it will act as an inhibitor and its presence will prevent most thefts from taking place.

The type of rally cap to which this invention pertains is made up of two parts which are joined by the use of machine screws which are hidden within the cap. One part is a cast member having threaded openings to receive the screws. The other part, which itself may be made of more than one part integrally connected to each other, has openings through which the screws pass in order to join the two parts together.

In one embodiment of this invention there is provided a ring member which is connected to the cap by way of the machine screws which are a part of the cap. Attached to the ring member is one end of each of a number of cables, usually four. The other end of each cable is attached to a washer which is designed to go on a wheel lug stud. The washer is placed on the lug stud on top of the nut and a second lug nut is installed on the lug stud securing the washer to the lug stud by tightening the nut. This arrangement insures the integrity of the rim mounted on the wheel. The cables are long enough to permit a person to reach under the cap to put the washers in place on the studs. The cap is then snapped in place on the tire rim in conventional fashion. In order to remove the rally cap, the latter must first be released from its frictional engagement with the tire rim, and then either a standard lug wrench reached under the cap to remove the lug nuts holding the keeper's washers, or all of the cables must be cut, all involving a significant delay which will discourage most thefts from taking place.

It is believed that the time involved in removing the rally caps is likely to be a significant factor in preventing many thefts of the caps. The lack of visibility of the manner in which the cap is locked will also act as a deterrent since the potential thief would not know in advance how to remove the cap. Furthermore, the use of the locking system will not detract from the appearance of the cap because of its lack of visibility. Still another advantage of this invention is that it does not require modification of the cap or tire rim, nor is the apparatus involve any significant expense or require a great deal of effort to employ, nor does it require the carrying of a special tool or a key, as in many other devices.

It is therefore a principal object of this invention to provide a device which will act as a deterrent to the theft of a rally cap.

Other objects and advantages of this invention will hereinafter become obvious from the following description of preferred embodiments of this invention.

BRIEF DESCRIPTION OF THE DRAWINGS

FIG. 1 is a perspective view of the large rally cap to which this invention is applicable.

FIG. 2 is an exploded view in partial section partially schematized of the cap shown in FIG. 1.

FIG. 3 is a perspective view of the anti-theft device which is a preferred embodiment of this invention.

FIG. 4 is a perspective view of the anti-theft device connected to the rally cap and about to be attached to the tire rim.

FIG. 5 is a partial section of the rally cap mounted on the wheel of an automotive vehicle with the anti-theft device shown in FIG. 3 in place.

FIG. 6 is a perspective view of the small rally cap to which this invention is also applicable.

DETAILED DESCRIPTION OF THE PREFERRED EMBODIMENTS

Figures 1, 2, 4:
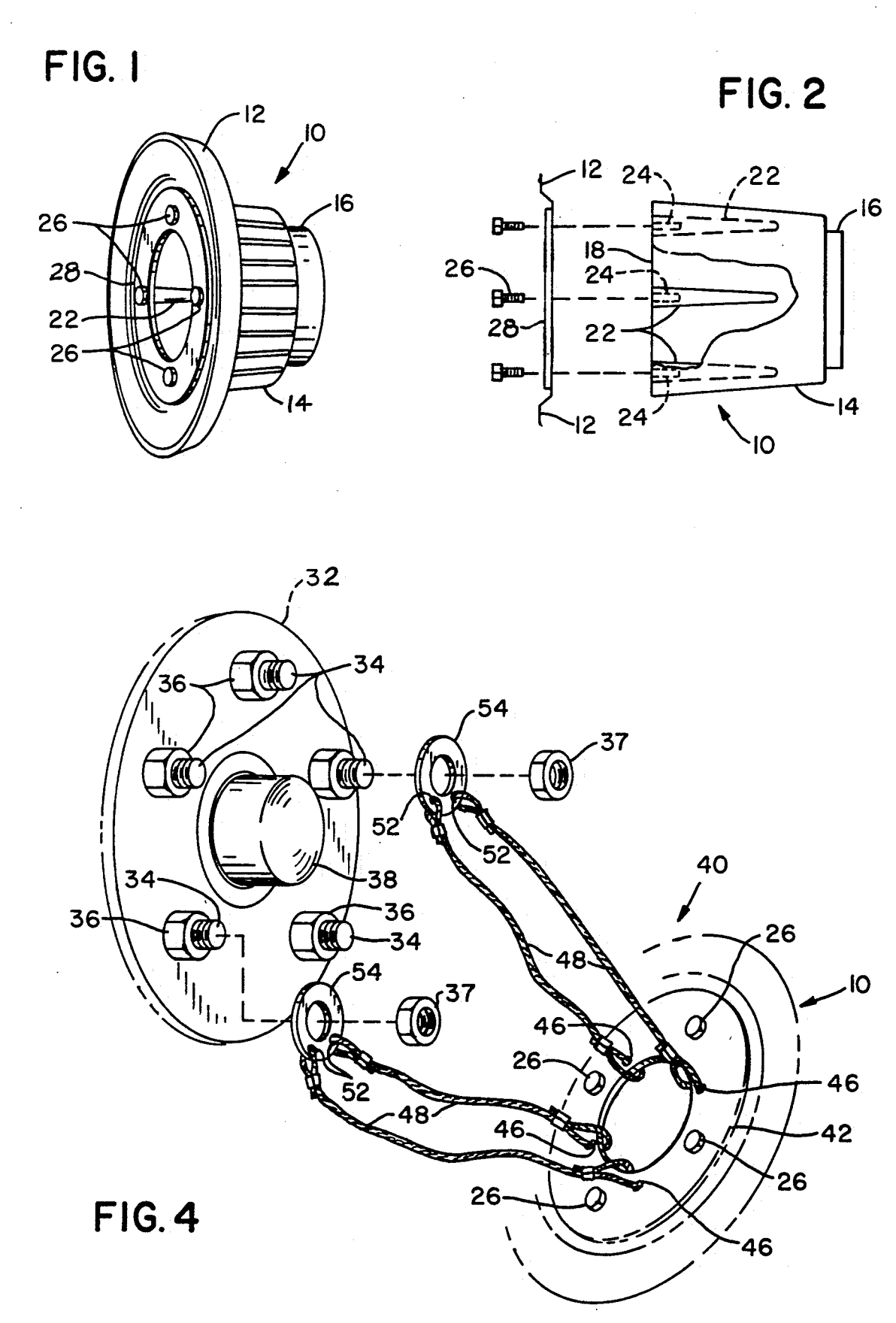

Referring to FIGS. 1 and 2, cap 10 consists of a dish member 12 and a cover 14. Cover 14 is a hollow conical section typically of cast metal with a decorative outer surface and closed at end 16 and open at 18. Lining the inner wall of cover 14 are extended protruding sections 22 to accomodate tapped openings 24 to receive machine screws 26 for the purpose of attaching dish member 12 and cover 14 together, as seen in FIG. 1. Dish 12 may itself comprise two or more pieces attached together to form an integral structure. Dish 12 is provided with an inwardly extending rim 28 for accomodating screws 26 which pass through openings in rim 28 for threading into tapped openings 24 located as described in cover 14, holding the assembly together.

As is understood in the art, rally cap 10 when in use is snapped onto a tire rim 32, shown in FIG. 5, being held in place by a frictional engagement with a lip 33, covering wheel lug studs 34 and lug nuts 36 and wheel hub 38. It is mounted by pushing in place, and, forming the problem to which this invention is directed, is removed simply by prying loose, usually with very little effort required.

Referring to FIGS. 3 and 4, anti-theft device 40 comprising the preferred embodiment of this invention consists of a flat ring 42 with holes 44. The size and shape of ring 42 is designed to be fit on rim 28 of rally cap 10 with holes 44 aligned with tapped openings 24. Ring 42 is mounted on rally cap 10 by removing screws 26, placing ring 42 on rim 28, and threading screws 26 through holes 44 into tapped openings 24.

Ring 42 is also provided with additional holes 46 through which is looped from the inside of ring 42 and tied with one end of a metal cable 48 for each hole 46. The other end of each cable 48 is looped through an opening 52 of a washer 54. As illustrated, two cables 48 may engage a single washer 54. Washers 54 are configured to fit on a wheel lug stud 34 between the lug nut 36 and another similar lug nut 37.

Since rally cap 10 completely covers studs 34 when mounted as shown in FIG. 5, cables 48 are long enough so that there is room to insert a wrench under rally cap 10 before mounting to install washers 54 on studs 34 before threading nuts 37.

Once washers 54 are installed as described, then rally cap 10 may be mounted on tire rim 32 as seen in FIG. 5, and cables 48 will remain nested under rally cap 10 and no part of device 40 will be visible from the outside.

To remove rally cap 10, cap 10 is pried loose in the usual manner but device 40 with cables 48 connected as illustrated and described will prevent rally cap 10 from being taken away. To remove rally cap 10 it is necessary to reach underneath with a standard lug wrench to remove nuts 37 from studs 34, and then remove washer 54 from the lug by first unthreading nuts 37. This acts as a deterrent to the theft of rally cap 10 when attempted to be taken on an opportunity basis rather than a planned theft. It is believed most thefts of rally caps are the result of seizing the opportunity.

In addition, the use of a separate ring 42 insures that in the event an attempt is made to pry cap 10 loose there will be minimal, if any, damage to the cap itself.

The small rally cap 60 is illustrated in FIG. 6. The basic construction with the use of machine screws 62 to attach the two parts 64 and 66 of the rally cap is similar to that of rally cap 10 so that a device similar to that of device 40 may be employed to properly secure rally cap 60 against theft.

It is thus seen that there has been provided an economic and effective arrangement for deterring the theft of a rally cap. While only certain preferred embodiments of many variations are possible without departing from the principles of this invention as defined in the claims which follow.

What is claimed is:

1. In combination with an automotive vehicle wheel, a rally cap having means for frictionally engaging said wheel to enclose the lug studs of said wheel, said rally cap constructed of at least two parts held together by threaded members, an anti-theft device comprising a ring, means in said ring for permitting all of said threaded members to attach said ring to said rally cap, a plurality of extended flexible members each attached at one end to said ring, and washer means to the other end of each of said flexible members for engagement with the lug studs of said wheel and retained by a second set of said nuts on said lug studs, said flexible members being of sufficient length to permit said second set of stud nuts to be removed to mount said washer means on said lug studs and mount said stud nuts while said ring remains attached to said rally cap, permitting said rally cap to be mounted on said vehicle wheel completely enclosing and hiding said anti-theft device and effectively deterring the theft of said rally cap.

2. The combination of claim 1 in which said ring comprises a flat annular plate, said threaded members passing through a rim formed in said rally cap, said plate fitted onto said rim so that said threaded members pass through said annular plate thereby securing said anti-theft device to said rally cap.

3. The combination of claim 2 in which each washer means is attached to more than one said flexible means.

4. The combination of claim 3 in which said annular plate includes separate openings for attachment by said flexible members.

5. The combination of claim 4 in which said flexible members are cables which nest within said rally cap when when mounted on said wheel.

6. The method of securing a rally cap frictionally to a wheel for enclosing the wheel studs to deter the theft of said rally cap, said rally cap constructed of at least two parts held together by threaded members, an anti-theft device comprising a ring, means in said ring for permitting all of said threaded members to attach said ring to said rally cap, a plurality of extended flexible members each attached at one end to said ring, washer means at the other end of said flexible members for engagement with the lug studs of said wheel and retained by multiple stud nuts on each of said lug studs, said flexible members being of sufficient length to permit said washer means to be mounted on said lug studs over existing nuts and securing with a second set of nuts said nuts while said ring remains attached to said rally cap, the steps of attaching said ring to said rally cap with all of said threaded members, mounting said washer means on the studs of said wheel, and frictionally engaging said rally cap on said wheel completely enclosing and hiding said anti-theft device and effectively deterring the theft of said rally cap.

* * * * *